April 28, 1964 C. C. CLEVELAND 3,131,094
ELECTROLYTE RETRACTING PAPER SPACER FOR SPIN ACTIVATED BATTERIES
Filed June 21, 1961
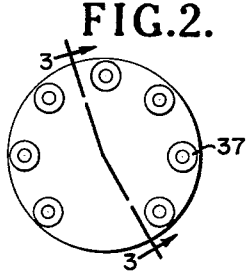
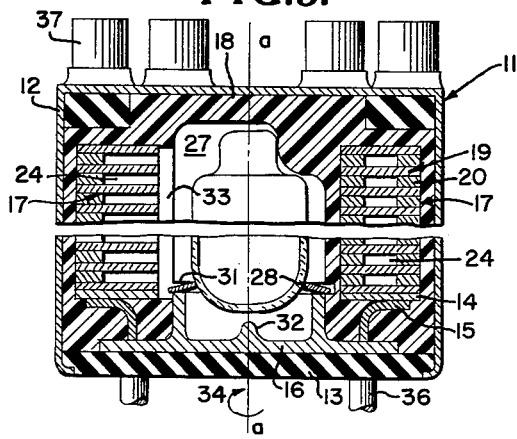
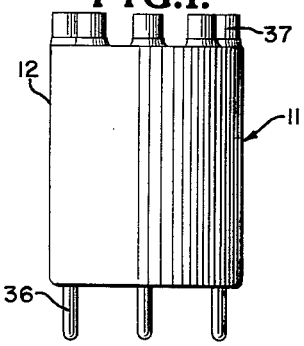
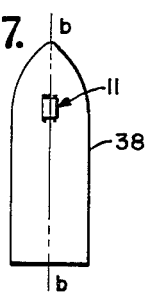
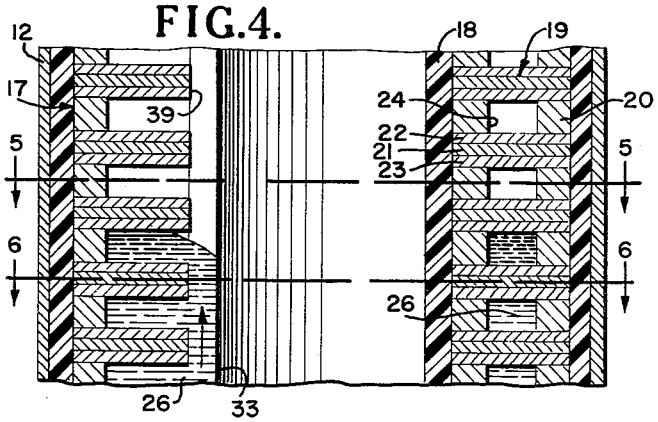
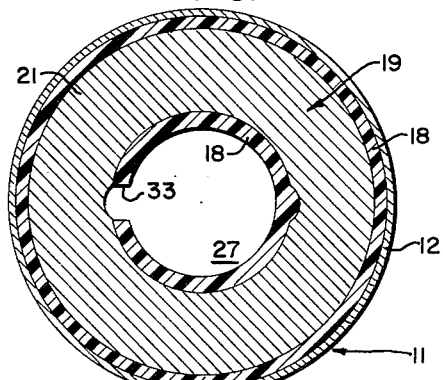
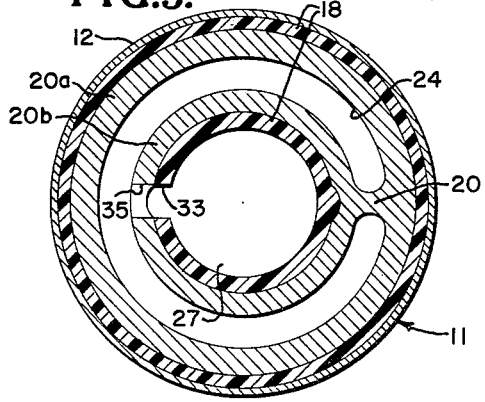
INVENTOR.
CLARK C. CLEVELAND
ATTYS AGENT

United States Patent Office 3,131,094
Patented Apr. 28, 1964

3,131,094
ELECTROLYTE RETRACTING PAPER SPACER
FOR SPIN ACTIVATED BATTERIES
Clark C. Cleveland, Bennington, Vt., assignor, by mesne assignments, to the United States of America as represented by the Secretary of the Navy
Filed June 21, 1961, Ser. No. 119,256
1 Claim. (Cl. 136—90)

The present invention generally relates to improvements in multi-cell, spin-filled batteries for use in projectiles and relates more particularly to a new and improved battery spacer which is composed of an absorbent material which absorbs the excess electrolyte thereby interrupting the electrolytic continuity from cell to cell across the exposed edges of the cell plates after the cells have been filled.

Those concerned with the development of such spin-filled batteries have long been confronted with the problem of preventing the individual cells from overfilling and thereby creating inter-cell short circuits which slow down the activation of the battery, shorten battery life and introduce the hazard of noise generation which, in turn, produce malfunctions in the device to which the battery supplies power.

Applicant has discovered that this critical problem of overfilling the cells and the consequent malfunctions can be overcome without the need of complex metering devices by the use of absorbent spacers between the plates of each cell. In addition to performing their normal functions of spacing the plates and providing a substantially closed cell space for the electrolyte, the use of absorbent spacers permits each cell to be filled completely full initially, whereupon, some of the electrolyte is absorbed by the spacer and is thereby retracted from the exposed edge of the plates defining each cell. Hence, the electrolyte levels out in each cell well away from the exposed plate edge and the continuity of the wet electrolytic path from cell to cell is effectively destroyed.

The absorbent spacers also serve the additional function of improving control over the battery stack length which varies in accordance with the electrode stock thickness and which, in a battery employing rigid spacers, must be compensated for by a separate stack trimming operation. Therefore, the use of absorbent spacers not only improves the electrical characteristics and operating quality of the battery, as pointed out herein before, but also assists in simplifying the manufacturing procedures involved in constructing each battery.

One object of the present invention is to provide new and improved means for greatly reducing or effectively eliminating inter-cell communication through the electrolyte at the exposed edges of the cell plates.

Another object is to effectively reduce and eliminate short circuiting of series connected cells in multi-cell, set-back activated, spin-filled batteries.

A further object of the invention is to effectively reduce the amount of excessive electrolyte present in individually overfilled cells.

Still other objects of the invention are to increase the activation of galvanic batteries, increase battery life and reduce the hazard of noise generation.

Yet another object is to improve control over the battery stack length during manufacturing of the battery.

Other objects and advantages of the invention will hereinafter become more fully apparent from the following description of the annexed drawings, which illustrate a preferred embodiment, and wherein:

FIG. 1 is a side elevational view of a battery incorporating the present invention;

FIG. 2 is a top plan view of the battery shown in FIG. 1;

FIG. 3 is an enlarged cross-sectional view taken along line 3—3 of FIG. 2 which illustrates the top and bottom portions of the stacked cell plates, the middle portion having been cut away;

FIG. 4 is a greatly enlarged cross-sectional view partially broken away and showing the stacked cell plates of FIG. 3 in greater detail;

FIG. 5 is a cross-sectional view taken along line 5—5 of FIG. 4;

FIG. 6 is a cross-sectional view taken along line 6—6 of FIG. 4; and

FIG. 7 is a schematic view of the battery properly orientated within a carrier projectile.

Referring now to the drawing, wherein a preferred embodiment of the invention is illustrated, numeral 11 generally designates a set-back activated, spin-filled, galvanic battery having an outer casing 12 which is crimped over or otherwise secured to an electrically non-conductive bottom member 13.

Stacked cells, generally designated 17 in FIG. 3, are in electrical contact with terminal plate 14 which rests upon stack support member 15, which, in turn, is supported by base member 16. As shown most clearly in FIG. 3, cells 17, plate 14, and support member 15 are encased within casing 12 by means of an electrically non-conductive potting resin 18. Each of cells 17 is comprised of two annular plates, generally designated 19, having an annular spacer 20 of an absorbent, electrically non-conductive material located therebetween. As shown more clearly in FIG. 4, each of plates 19 is comprised of an electrically conductive shim 21, one side of which has been coated with an electrolytically active layer 22 of a material such as lead (Pb) and the other side of which has been coated with an electrolytically active layer 23 of a material such as lead dioxide ($PbO_2$). Each cell 17 is therefore composed of an anode 23 and a cathode 22 with a spacer 20 therebetween. As shown in FIG. 5, spacer 20 has a radially outer ring portion 20a and a radially inner ring portion 20b which define annular space 24 therebetween. At this point, it should be noted that outer ring 20a is continuous, whereas, inner ring 20b is interrupted by passage 35, the function of which will be more clearly apparent as the description proceeds. Referring now to FIG. 3, numeral 25 designates a glass ampule which contains electrolyte 26 and which is supported in cavity 27 by snap washer 28 seated on base member 16 and secured against vertical movement by groove 31 in potting resin 18.

Referring now to FIGS. 5 and 6, cavity 27 is surrounded by potting resin 18 and is completely separated from stacked cells 17 except as provided by channel 33 which, as more clearly shown in FIGS. 3 and 4, extends vertically from the bottom cell plate to the top cell plate thereby forming a fluid passage interconnecting cavity 27 with each of annular cell spaces 24. The terms "top" and "bottom" as employed herein are defined as viewed in FIG. 3.

The operation of the battery will now be described. Before the time of intended activation and use, battery 11 is inserted as a unit into a carrier vehicle such as projectile 38 shown in FIG. 7. Battery 11 is orientated within projectile 38 such that its vertical axis a—a is substantially coincident with the vertical spin axis b—b of projectile 38 and the battery is electrically connected to the other components of the projectile (not shown) by means of positive, male connector prongs 36 and negative, female connectors 37 which are electrically connected to opposite ends of stacked cells 17. At this time, electrolyte 26, such as fluoboric acid is contained within ampule 25 so that the battery is in its "dry" or inactive state as shown in FIG. 3, and battery 11 remains in this state until such time as projectile 38 is fired or otherwise launched, whereupon, the battery is activated in the following manner:

Upon sudden acceleration of projectile 38 containing battery 11, the inertia of ampule 25 causes washer 28 to snap downwardly whereby ampule 25 strikes projection 32 and is shattered, thus releasing electrolyte 26 within cavity 27. At the same time, projectile 38 and battery 11 are subjected to rotational spin about their respective axes a—a and b—b as indicated by arrow 34 in FIG. 3 whereby centrifugal force causes electrolyte 26 to flow radially outward of cavity 27 through channel 33 into annular spaces 24. Furthermore, during the above indicated acceleration period, the released electrolyte is believed to be maintained substantially in the lower portion of cavity 27 and in the lowermost cells 17. Thereafter, when projectile 38 and battery 11 begin to decelerate, the electrolyte flows upwardly in channel 33 and radially outward into spaces 24 of the middle and upper cells in the order named. While the exact flow pattern of the electrolyte is unknown, it has been determined that the flow occurs substantially as described. That is, the lower cells are filled first and the overflow of electrolyte then passes upwardly, filling each of the upper cells. Therefore, as shown in FIG. 4, during the period of acceleration and during the initial part of the deceleration period, exposed edges 39 of the plates along channel 33 are in electrical contact with each other due to the wet flow path presented by the electrolyte. This condition, while undesirable, is tolerable so long as it can be terminated as soon as all of the cells are filled; however, it was found that due to the surface tension of the electrolyte and the relatively great centrifugal forces which occur at typical spin velocities in the neighborhood of 350 r.p.s., the electrolyte tend to adhere to the edges 39 even after all of the cells were filled, thereby effectively short circuiting some of the cells, particularly those near the bottom of the stack which were excessively overfilled.

With the use of applicant's absorbent spacers 20, however, this problem is effectively eliminated since the excess electrolyte is absorbed by the spacers and is thereby retracted from exposed edges 39. As a result, all of the cells may be initially overfilled, thereby providing an adequate supply of electrolyte to each cell, and thereafter, the excess electrolyte is absorbed into the spacers 20 allowing the electrolyte to level out in each cell well away from the exposed edges 39 of the plates, thereby breaking the continuity of the wet electrolyte path from cell to cell. Thus, by eliminating the short circuit paths, the battery is quickly activated, the battery life is extended and the hazard of noise generation is effectively eliminated. In addition, since the absorbent spacers 20 are compressible, the battery stack length may be easily controlled by merely compressing the stacked cells as required before potting said stack in housing 12. Therefore, the absorbent spacers not only improve the electrical characteristics and operative qualities of the battery itself, but they also assist in simplifying the manufacture procedures.

While absorbent filter paper has been found to be a particularly efficient and economical material for spacers 20, it is to be understood that the invention is by no means limited thereto and that any material which is absorbent to the desired degree may be employed. In addition, although the invention has been described with reference to set-back activated, spin-filled batteries which are particularly intended for use in projectiles, it is to be understood that the invention is not limited to use therewith, but may be employed in any spin-filled battery to obtain the results set forth hereinabove.

Various modifications are contemplated and may obviously be resorted to by those skilled in the art without departing from the spirit and scope of the invention, as hereinafter defined by the appended claim, as only a preferred embodiment thereof has been disclosed.

Having thus described the invention, what is claimed is:

A spin filled set-back activated galvanic battery comprising a plurality of annular stacked plates forming the anodes and cathodes of a plurality of cells, means containing an electrolyte disposed within the internal circular opening of said annular plates, absorbent spacers disposed between alternate ones of said plates and having an outer ring portion formed with a wholly interrupted concentric inner ring portion, said ring portions being concentric with said plates and having an arcuate space therebetween, each said inner ring portion having an inner wall concentric with the inner walls of said annular stacked plates and having a radial passage therethrough at said wholly interrupted portion to form electrolyte entry ports, said radial passage bounded by the inner edges of said alternate annular stacked plates and the adjacent surfaces thereof, means disposed within said circular opening of said annular plates having a vertical channel therein for enabling electrolytic communication of said entry ports with said electrolyte containing means whereby electrolyte at the surfaces of said inner walls of said annular stacked plates is subject to absorption by said absorbent spacers defining said passage and adjacent said inner walls of said annular stacked plates.

References Cited in the file of this patent

UNITED STATES PATENTS

| | | |
|---|---|---|
| 701,253 | Bennett | May 27, 1902 |
| 2,847,494 | Jeannin | Aug. 12, 1958 |
| 2,981,778 | Freund | Apr. 25, 1961 |
| 2,985,702 | Dorland et al. | May 23, 1961 |

FOREIGN PATENTS

| | | |
|---|---|---|
| 1,091,667 | France | Nov. 3, 1954 |
| 1,233,509 | France | May 9, 1960 |